United States Patent [19]

Nelson et al.

[11] Patent Number: 4,691,239

[45] Date of Patent: Sep. 1, 1987

[54] DYNAMIC VIDEO SYSTEM AND METHOD

[76] Inventors: Martin N. Nelson, 50 Willowview Ct., Danville, Calif. 94526; J. Kirkwood H. Rough, 264 South 14th St., San Jose, Calif. 95112

[21] Appl. No.: 452,494

[22] Filed: Dec. 23, 1982

[51] Int. Cl.⁴ ............................................. H04N 1/040
[52] U.S. Cl. .................................... 358/282; 358/283; 358/284; 382/53
[58] Field of Search ............... 358/282, 284, 166, 174, 358/280, 283; 382/53, 51, 50, 52, 54

[56] References Cited

U.S. PATENT DOCUMENTS

| | | | |
|---|---|---|---|
| 3,869,698 | 3/1975 | Trost et al. | 382/53 |
| 3,909,594 | 9/1975 | Allais et al. | 382/53 |
| 4,276,568 | 6/1981 | Wischer | 358/282 |
| 4,345,314 | 8/1982 | Melamud et al. | 358/166 |
| 4,442,544 | 4/1984 | Moreland et al. | 382/53 |
| 4,446,486 | 5/1984 | Itoh | 382/53 |

OTHER PUBLICATIONS

R. E. Penny "Dynamic Threshold Setting Circuit", vol. 18, No. 6, Nov. 1975, pp. 1962-1965, IBM Tech. Discl. Bulletin.

H. Klepp "Dynamic Video Thresholding", vol. 22, No. 3, Aug. 1979, pp. 1031-1033 IBM Tech. Discl. Bulletin.

*Primary Examiner*—Edward L. Coles, Sr.

[57] ABSTRACT

The processing of video signal information derived from scanning the characters or marks on a background sheet includes normalizing the signal levels against changes in operating conditions and dynamically altering the threshold level of the video signal in response to the changes in levels of video signal.

18 Claims, 13 Drawing Figures

READ-ZONE GUIDE

Figure 6

DYNAMIC VIDEO SYSTEM AND METHOD

BACKGROUND OF THE INVENTION

Many known optical mark or character-reading devices rely on simple video circuits for sensing contrasting marks or characters appearing on documents for producing electrical signals which are interpreted to yield information about the mark or character sensed. Video circuits of this type commonly require high-contrast marks or characters against clean, white background to assure proper operation and correct sensing of the mark or character. Certain threshold levels are usually selected in such video circuits in order to optimize the accuracy of sensed information for the conditions of darkness or density of the marks or characters to be sensed, the background color of the document, the level of background illumination used, the speed of character scanning, and the like. However, such simple video circuits commonly suffer degradation in sensing accuracy for a given setting of threshold levels as a result of changes in such parameters as the density of marks or characters being sensed, the background color, the level of illumination, the scanning speed, the type or font of characters being sensed, and the like.

SUMMARY OF THE INVENTION

In accordance with one embodiment of the present invention, a dynamic video system alters operating thresholds as the system operating conditions change from character to character being sensed. In this way, the short-term variations in operating conditions (e.g., the characters being scanned, character darkness) as well as the longer-term changes in operating conditions (e.g., background color, intensity of background illumination) are all compensated for to insure a high degree of sensing accuracy under all operating conditions.

DESCRIPTION OF THE DRAWINGS

FIG. 5b is a graph showing the signals produced by the circuit of FIG. 1 when scanning the character of FIG. 5a.

DESCRIPTION OF THE PREFERRED EMBODIMENT

Figures 1, 1A:
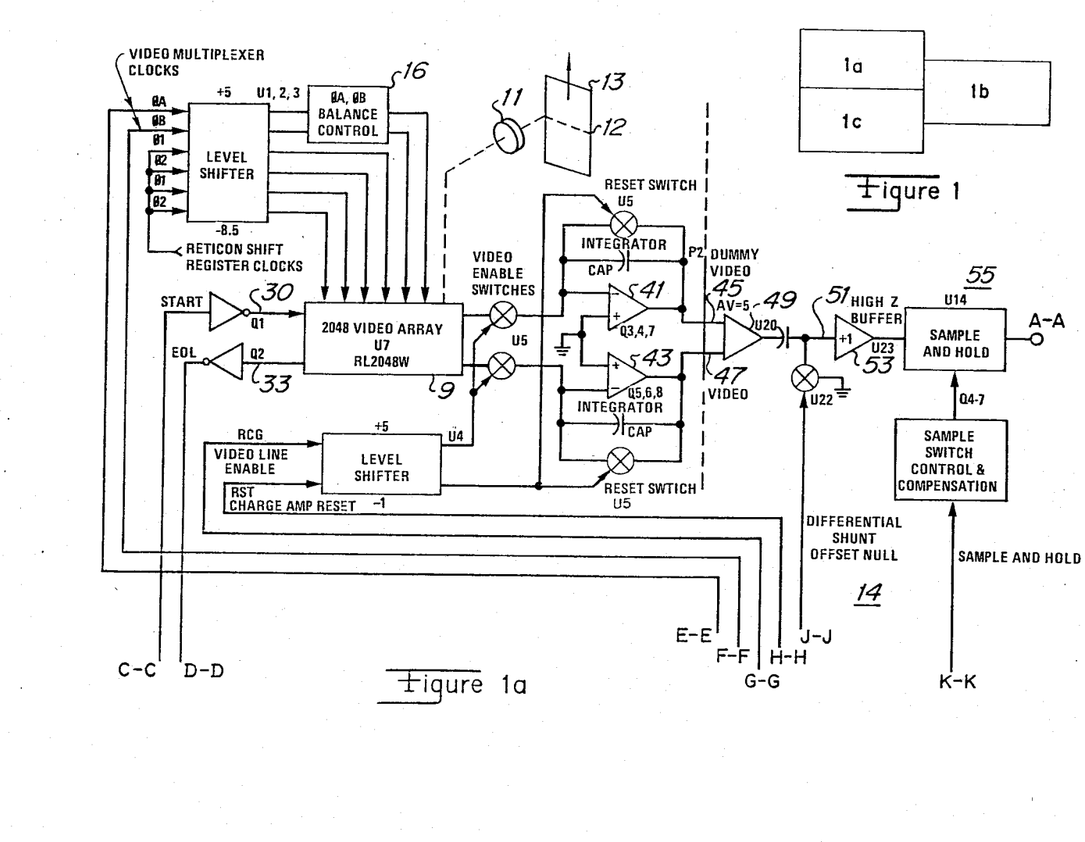
FIGS. 1a and 1b comprise a block schematic diagram of an improved video circuit according to the present invention.
Figure 1B:
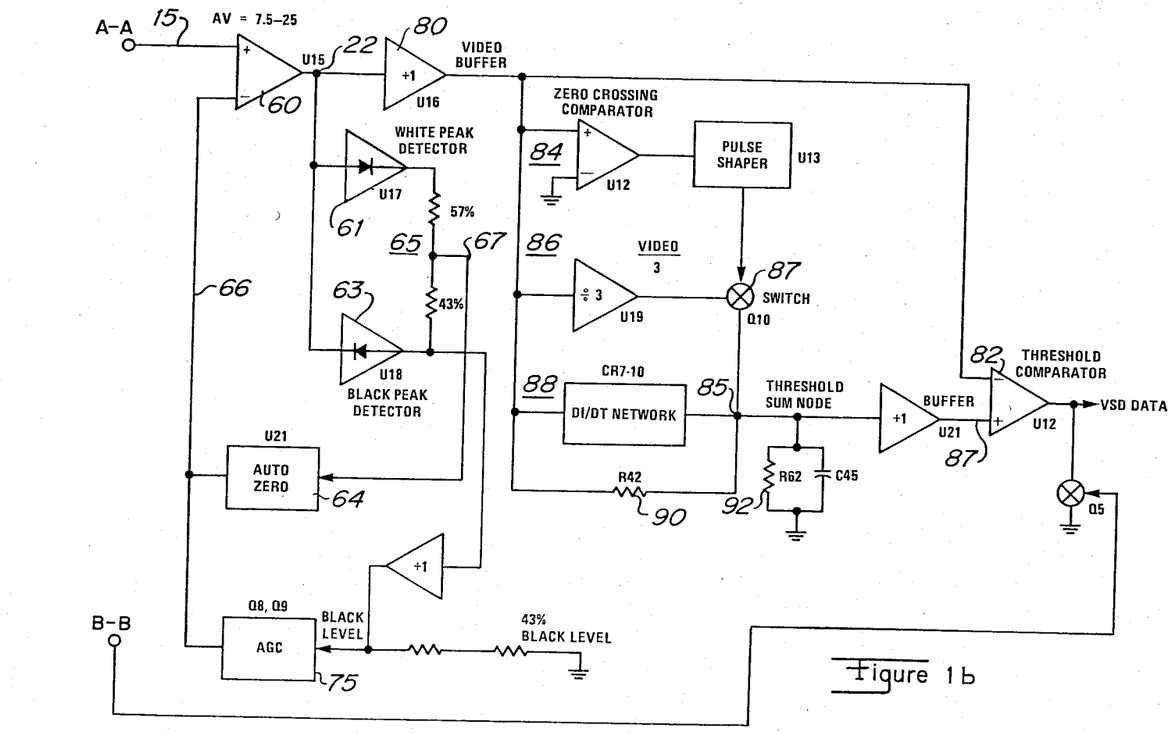
Figure 1C:
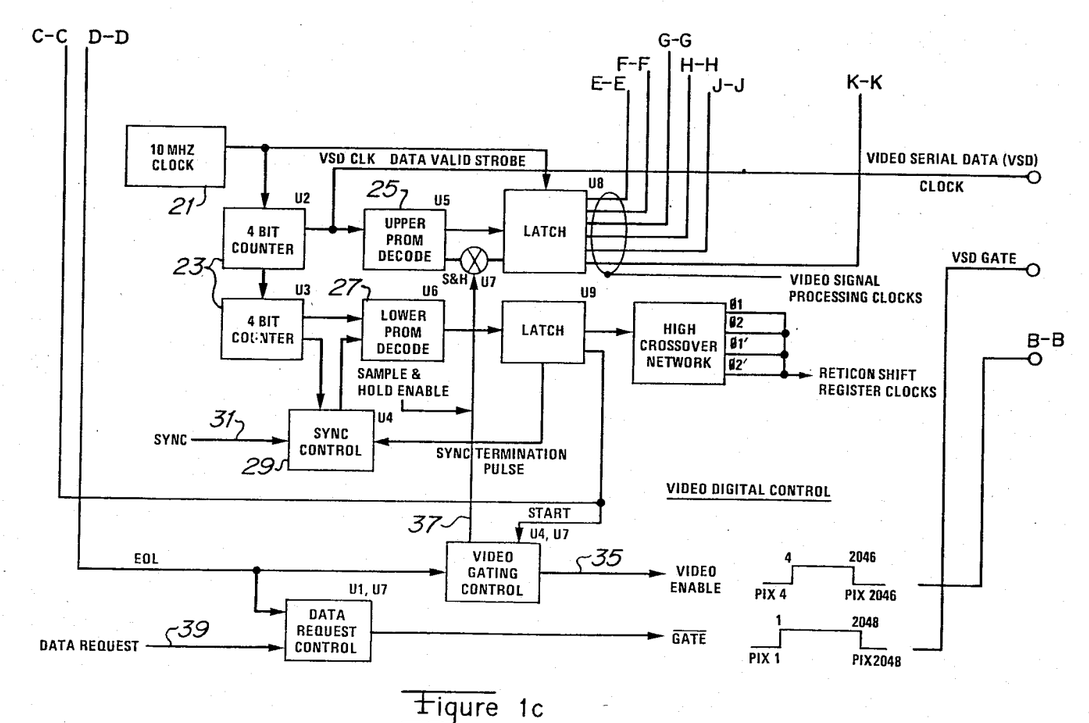

Referring now to FIGS. 1a and 1b, there is shown a schematic diagram of the improved video circuit of the present invention. A conventional solid-state video detector 9 such as a clockable array of, say, 2048 charge-storing diodes (commercially available from Reticon Corporation of Sunnyvale, Calif.) is optically arranged via lens system 11 to scan a limited sector or "slice" 12 of the width of a document 13 as the document is moved relative to the lens system 11. In this way, the video detector 9 sequentially senses portions of each slice 12 from one side to the other of the document 13 and sequentially senses successive slices from top to bottom of the document. The diodes in the array that forms the video detector 9 are sequentially activated or clocked using the circuitry 14, later described, to produce signals on line 15 which are representative of contrasting images sensed at sequential locations along a slice 12. These signals are processed according to the present invention to provide video signals 15 which are normalized or compensated relative to changes in various operating parameters.

More specifically, the video detector 9 includes two linear arrays of 2048 photodiodes which are arranged parallel to each other. One array is masked over and is used as a dark reference. Each array is divided into 1024 pairs of adjacent diodes. The odd diodes are selected with "phase A" of clock 16 and the even diodes are selected with "phase B" of clock 16. The phase A, phase B clocks are level shifted from TTL voltage levels (0 to 5 V) to video detector operating levels ($-5$ V to $+5$ V) and then balance controlled to avoid inducing offsets in the resulting video output.

There are two shift registers of 512 bits each built into the array. A single logic "0" is passed through each register to sequentially enable the diode pairs. Thus, each shift register enables alternate pairs of diodes, for example, as logic "0" is sequentially shifted through the register to effectively couple one diode at a time from each array to the video output bus of the array 9 at a frequency of 625 kHz.

The system clock 21 is used to clock the counters 23 which, in turn, address the upper and lower control decoders 25, 27. These decoders generate all of the clock phases necessary to properly sequence the array of diodes in the video detector 9. The sync control circuit 29 receives a signal 31 which recurringly starts the video scan sequence. The start pulse is applied to the shift registers of the video detector and represents the single "0" bit that is shifted through the registers. When this bit exits the other end of the shift register, it is called the end-of-line (EOL*) signal 33 which turns off the video enable signal 35 and the sample-and-hold signal 37.

The video enable signal is used to occlude the first three and the last two pixels from the array. These bits are not reliable due to internal start-of-line and end-of-line shift register noise.

A Data Request signal 39 may appear asynchronously with respect to a video scan cycle. The request is held until the start of the next scan at which time the GATE signal is activated. The GATE signal is thus synchronous with video enable and preserves a constant video integration period.

The output circuitry associated with the video detector 9 measures the video signal on each diode which operates in a charge-storage mode. Initially, all diodes are fully charged with about 2.2 picocoulombs at 5 V. The photodiode capacitance is thus about 0.44 picofarad. During the video integration period, the charge is depleted by photon current and leakage. Dark current leakage changes with operating temperature, so the second array is masked from light and serves as a thermally-referenced array. Both diode arrays thus measure dark current, charge injection noise, video substrate current and substrate imbalance. The dummy array responds to all conditions except photon excitation.

A pair of integrator operational amplifiers 41, 43 are used as charge amplifiers to measure the video signals from the arry. When the system is ready the reset switches are enabled and current flows into the minus node of the integrator differential amplifier which is referenced to ground.

The outputs of both integrators are applied to a difference amplifier 49 to produce the desired video signal at the output 51 and the resulting dummy video signal 45 is now subtracted from the video signal 47 which is then applied to a high-impedance buffer 53 and a sample-and-hold circuit 55. The video sample is taken when the signal is stable, after any switching transients, and is held as a signal level at output 15 until updated by the next sample.

Figure 2:
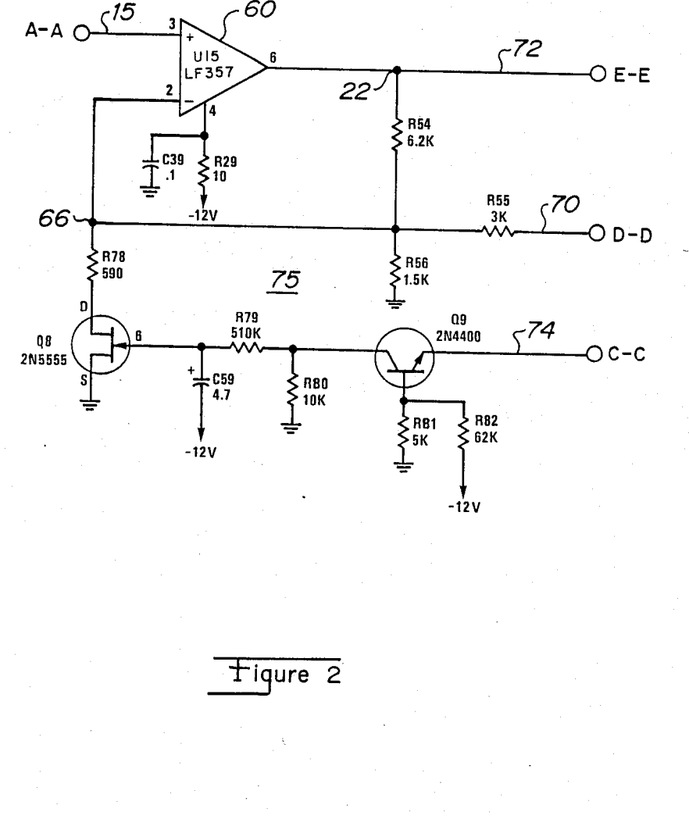
FIG. 2 is a partial schematic diagram of the automatic zero circuit and automatic gain control circuit of FIG. 1.
Figure 3A:
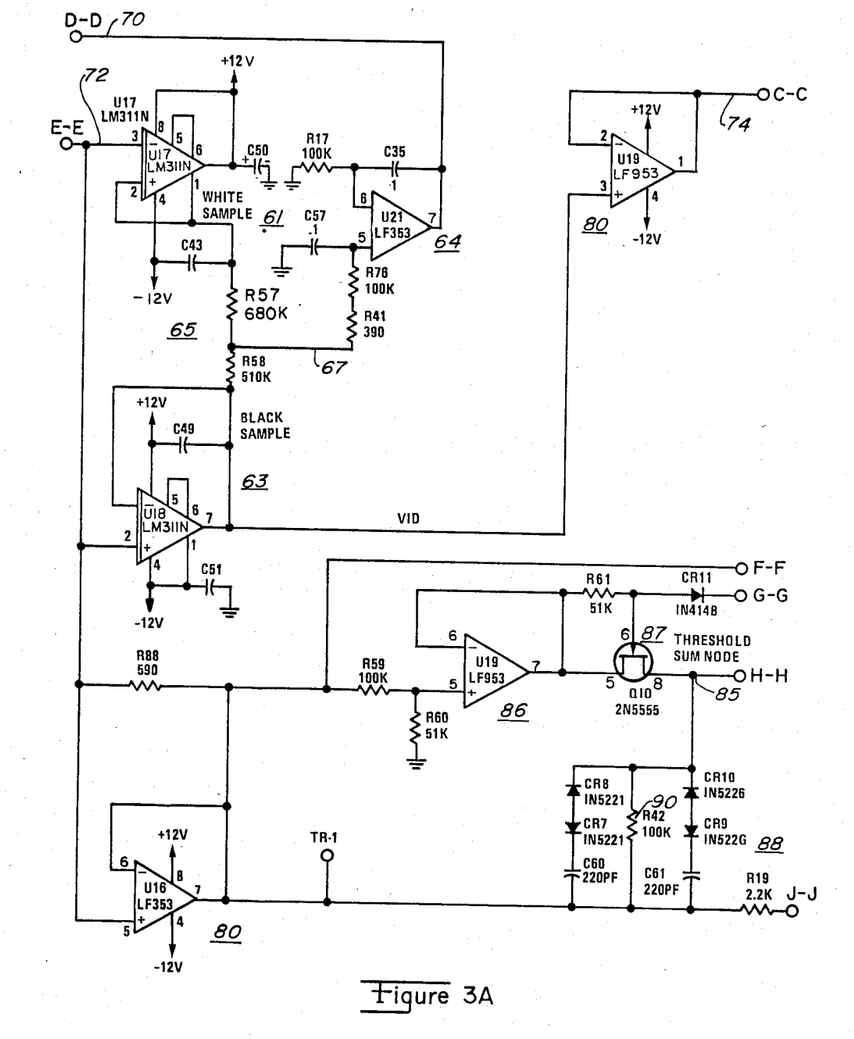
FIGS. 3a and 3b are detailed circuit diagrams of the video circuit of FIG. 1.
Figure 3B:
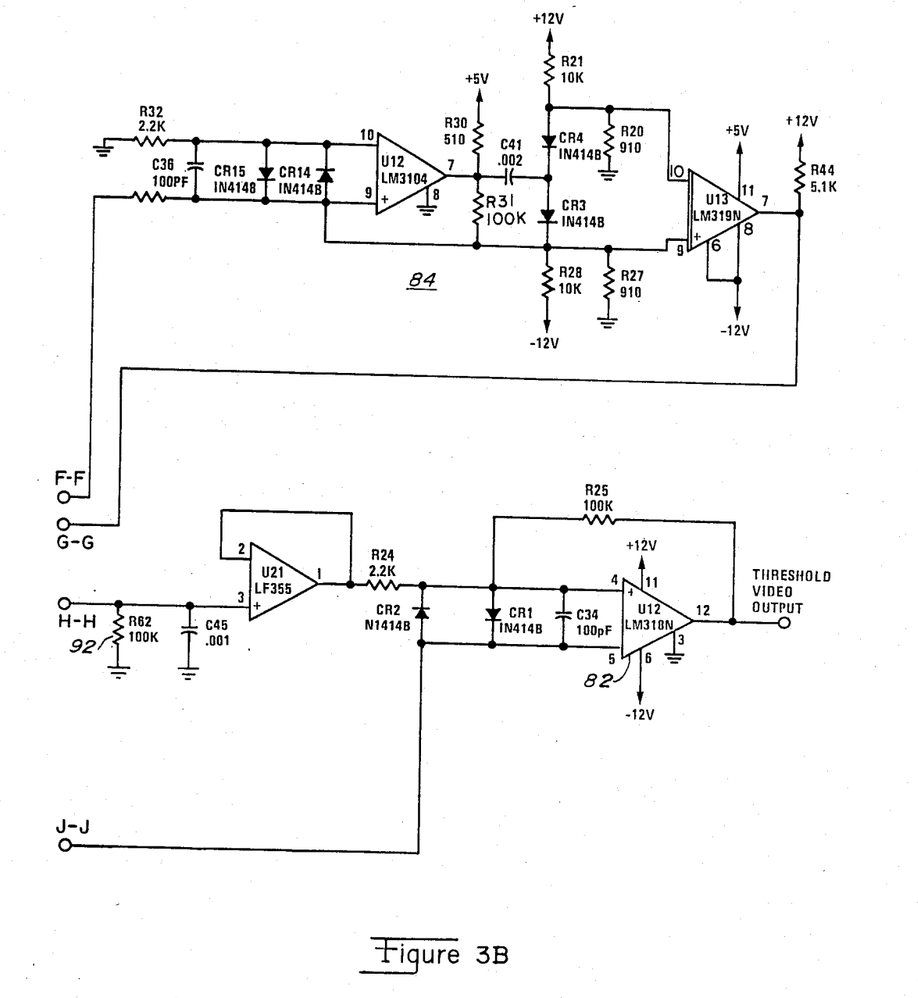

According to one aspect of the present invention the signals on line 15 are video processed to determine the black and the white video information. As illustrated in FIGS. 2 and 3, the white and black peak detectors 61, 63 sense the maximum and minimum video signal voltages 22. These peak values only decay slowly with a time constant of about 500 millisec. Voltage divider 65 establishes a nominal threshold voltage 67 that is about 57% of peak white and about 43% of peak black in one embodiment of the invention. This nominal threshold is applied via the auto-zero circuit 64 to the video amplifier 60 so that this nominal threshold voltage is the ground reference (0 volts).

The gain of the video amplifier 60 is adjusted by the automatic gain control circuit 75 to provide a constant video output of about 10 volts. The peak black sample 63 remains about $-4.3$ V and any variance from this value will cause an adjustment in the gain control 75 to restore $-4.3$ V.

The video signal 22 thus processed passes through a buffer amplifier 80 and is further processed in the final threshold and comparison circuitry. This buffered signal is applied to the minus side of the threshold comparator 82 and is also applied to the dynamic threshold circuits 84, 86, 88 which derive the threshold control signal 87 that is applied to the plus side of the threshold comparator 82. The threshold comparator 82 produces the video serial data (VSD) at the output as digital signal representing "1" and "0" logic levels. The VSD output may then be applied to character-recognition circuitry which forms no part of this invention. The threshold control signal 87 is initially established at the sum node 85 at about half the value between video and ground by a pair of equal-value resistors 90, 92. A capacitor 94 is also connected to node 85 to delay fast-changing video levels with a time constant of about 50 microseconds. Whenever the video signal crosses ground level, the sum node 85 must be charged for the new video level. The zero-crossng detector 84 activates a switch 87 that allows the video amplifier 86 to recharge the sum node 85. This video amplifier 86 is set to establish a new node level at about one-third of the actual video that just changed levels.

Figure 4A:
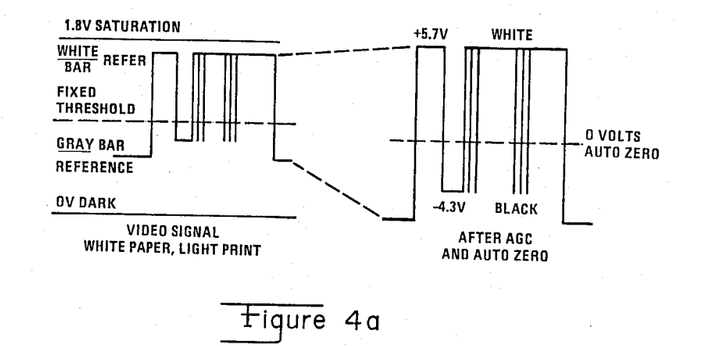
FIGS. 4a, b and c are graphs showing waveforms of signals produced by operation of the circuit of FIG. 1.
Figure 4B:
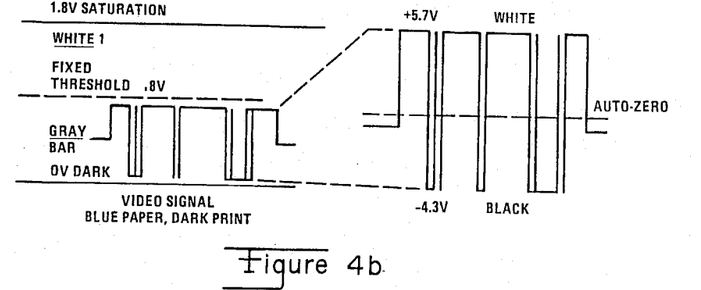
Figure 4C:
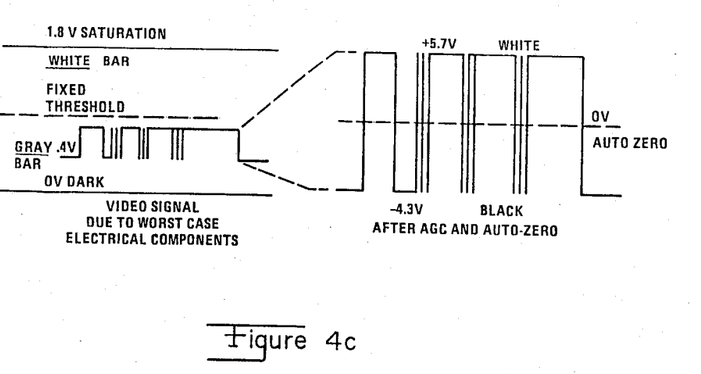

In addition, the differentiator network 88 functions for very high speed changes in video. This circuit responds to the rate of change of applied signal to reduce the signal on node 85 a proportionate amount, say, by one-fifth. For example, if $dI/dT =1$, then the value of signal on the sum node 85 is reapportioned in same polarity by one-fifth. These circuits are designed to reduce the time lag between the actual video signal 15 and the signal level that establishes the threshold level. These automatic adjustments provide dramatic improvement in the ability to detect characters or marks on a document 13 over a wide range of conditions. For example, the video detector 9 has a fixed dynamic range of output signals from darkness to saturation. Thus, at the input 15 to the video processing circuitry of the present invention, there are several possible signal waveforms, as shown in FIGS. 4a, b and c. It can be seen from these illustrations that an absolute threshold level halfway between black and saturation would only be usable for a limited range of documents. Note from FIG. 4b, for example, that colored-paper documents exceed the capability of a fixed threshold design to distinguish between black and white. However, the automatic threshold circuitry of the present invention adjusts for varying paper-to-print contrast to accept white or colored documents 13 with light or dark printing. Thus, FIG. 4a shows a video signal before and after processing according to the present invention. It should be noted that a fixed threshold would detect almost no black so a document would appear faded out. The present circuitry selects a level between the peak black and white levels to normalize the signals for such documents. Similarly, FIG. 4b shows a blue-paper document with dark printing which, without the present circuitry, would appear solid black.

Thus, it can be seen that an auto-zero threshold which is approximately halfway between the peak black and peak white provides excellent, automatic response to changes in the sensed contrast conditions.

Figure 6:
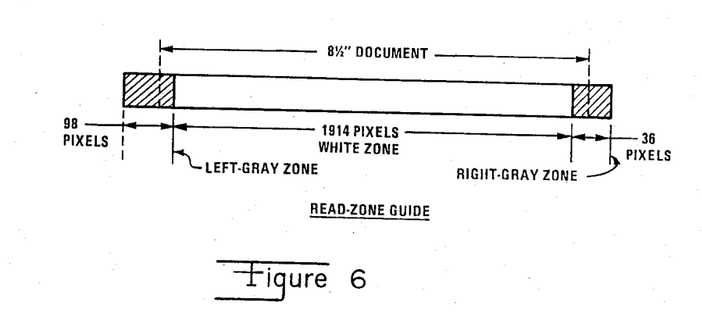
FIG. 6 is a pictorial illustration of the read-zone guide disposed behind the document in alignment with the video scanner.

In the absence of paper in the machine, the video detector 9 is focused on a background target called the "read-zone guide", as shown in FIG. 6. The gray zone color is about 67% of absolute carbon black. This is selected as a compromise between the requirements for detecting the presence of document 13 in the machine and an initial black video reference for light print found on a typical population of documents. The presence of a document (page detect) in the machine is detected when the left gray zone becomes partially covered, as shown in FIG. 6. The white color level of the read-zone guide provides an initial white video reference which is about 70% of absolute Magnesium Oxide whtie. This color also improves the light reflectivity of most paper (which is semi-transparent that is placed in front of the read-zone guide.

The choice for nominal threshold level relative to peak white is determined as a result of testing a large number of typical documents. Thus, in one embodiment a level is set that is about 57% of peak white and about 43% of peak black as a nominal threshold level. Also, any dirt or smudges near the 50% level will be seen as white instead of black noise. The video amplifier 60 is adjusted so that this point represents ground (0 volts). The modified signal has 57% above ground ($+5.7$ V) and 43% below ground ($-4.3$ V). The time constant for the auto-zero circuit 64 is about 100 millisec/per volt. In another embodiment, the nominal threshold may be set at about 45% of peak white and 55% of peak black, based upon tests of a selected population of documents.

Note that the gain of the video amplifier 60 is adjusted to provide a constant 10 volt peak-to-peak video output. The peak black sample should be $-4.3$ V. Any variance from this value causes an adjustment in the gain control to restore $-4.3$ V. The gain of the video amplifier 60 can be adjusted within a selected range of, say, 7 to 25, and the time constant of the automatic gain control 75 is about 500 millisec.

Additionally, the present invention eliminates the need for electronic adjustments for variations in lamp intensity, array sensitivity, or component values. FIG. 4c shows a video signal that represents a combination of worst-case conditions. The low signal level may be due to low lamp output, low sensitivity of the video detector, and low output from the charge amplifiers. However, the automatic gain circuit amplifies the illustrated 0.400 volt peak-to-peak signal with a gain of 25 to provide the necessary signal amplitude of 10 volts peak-to-peak.

The time constant for automatic gain control is selected at about 500 millisec, which corresponds to about 125 scans of incremental length, or "slices" 12 along the length of the document 13. This time constant allows the circuit to adjust for both slowly varying contrast and two-tone contrast documents.

The dynamic threshold circuitry of the present invention is designed to process fast-changing video signals accurately. This allows characters of varying print darkness, as shown in FIG. 5a, and with close physical spacing to be individually resolved, as shown in FIG. 5b.

Figure 5A:
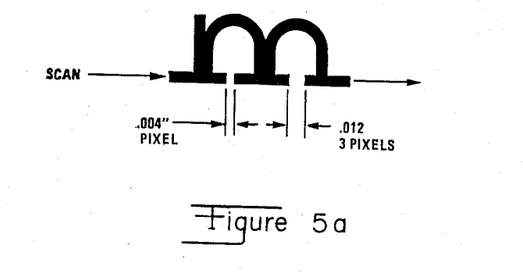
FIG. 5a is a chart showing a letter "m" to be scanned.

FIG. 5a shows the letter "m" with one or more pixel (i.e., unit picture element) spaces between segments on the bottom.

Figure 5B:
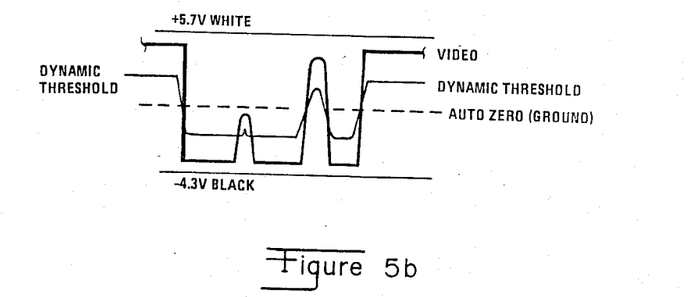

The video signal for the scan through the lowest portion of the "m" appears in FIG. 5b.

The video signal associated with an optical scan along the bottom of the "m" includes a resposne to the one-pixel gap which may have a fast rise-time but may not cross the nominal threshold point. The video detector exhibits a change in output response from full white pixel to full black pixel that is sometimes referred to as Modulation Transfer Function (MTF), and is specified at about 60% of full dynamic range. The present invention provides a threshold level about halfway between ground and the video signal. A narrow video pulse that crosses the dynamic threshold level can thus be more readily resolved. The resulting threshold video signal may then be applied to correlation circuits (not shown) which determine what character was sensed from the patterns of the video signals for all scan slices through a character.

Therefore, the present invention greatly improves the accuracy of character detection under such diverse conditions as colored background, low sensitivity or low modulation transfer function (MTF) of the imaging optics, partially black characters, low-level illumination, complexity of characters being detected, and the like. In addition, the present invention obviates the need for circuit adjustments to correct for variations in electrical components, operating temperature, or background color of the document being scanned. The resulting video signal is thus normalized against changes in most operating conditions and is more reliably representative of the characters being detected.

We claim:

1. Method of processing video signals representative of contrasting marks detected on a background document comprising the steps of:

detecting the extreme limits of amplitude of a plural number of video signals, adjusting the extreme limits of amplitude of the video signals to amplitudes that are greater than and less than a first selected intermediate auto-zero reference level, and dynamically detecting with a second dynamic reference level the adjusted video signals of amplitude greater in one direction than said first selected intermediate auto-zero reference level but less than said video signals as representing detected contrasting marks, and dynamically detecting the adjusted video signals of amplitude greater in the opposite direction than said first selected intermedite auto-zero reference level but less than said video signals as representing detected background of the document.

2. Method as in claim 1 wherein in the step of adjusting, a first selected portion of one extreme limit of amplitude is logically combined with a second selected portion of the other extreme limit of amplitude to represent said second, dynamic reference level.

3. Method as in claim 2 wherein said first selected portion is within the range of 40% to 60% of said one extreme limit, and said second selected portion is substantially inverse to said first selected portion and is within the range of 60% to 40% of said other extreme limit.

4. Method according to claim 1 including the additional step, prior to the second step of detecting, of expanding the amplitudes of signals which are adjusted with respect to about said selected reference level to extend between upper and lower limits for substantially all signals representative of contrasting marks detected on a background document.

5. Method according to claim 4 wherein said upper and lower limits of expanded signals are proportional to said first and second selected portions, respectively, of the limits of amplitude.

6. Method according to claim 4, wherein in said step of expanding the amplitudes of signals, the rate of change of expanding the amplitudes of the signals to attain the upper and lower limits is slower than the rate of change of thd adjustment of the signals about said selected reference level.

7. Method according to claim 4 comprising the additional step, intermediate the second detecting and expanding steps, of establishing a threshold level with respect to which the detecting step is performed as a predetermined subportion of the expanded and adjusted signals representative of contrasting marks optically detected on a background document.

8. Method as in claim 7 wherein in said step of establishing a threshold level, the threshold level is also altered in response to the rate of change of the adjustment of signal amplitudes with respect to the reference level exceeding a value which is greater than the rate of change at which signal amplitudes are expanded between said upper and lower limits.

9. Method as in claim 7, wherein in said step of establishing a threshold level, the threshold level is also altered in the same direction as the change in amplitude of the expanded and adjusted signals in response to the amplitude of said signals crossing the established threshold level, said altering being established at a rate of change faster than the rate of change at which signals are expanded between said upper and lower limits.

10. Apparatus for processing video signals of contrasting marks detected on a background document, comprising:

detector means responsive to video signals representative of contrasting marks for producing upper and lower signal levels indicative of the maximum and minimum amplitude levels of a plurality of such signals representative of contrasting marks, circuit means responsive to the upper and lower signal levels for producing first intermediate and second dynamic reference signals, amplifier means coupled to receive said first and second reference signals for altering the maximum and minimum levels of such video signals representative of contrasting marks to interpose the level of said second dynamic reference signal between said maximum and minimum amplitude levels but less than said first intermediate reference signal, and threshold means for producing an output indicative of a detected contrasting mark in response to an altered signal level exceeding a threshold level of said second dynamic signal in one direction, and for producing an output indicative of detected background of the document in response to an altered signal level exceeding the threshold level of said second dynamic signal in the opposite direction.

11. Apparatus as in claim 10 wherein said circuit means is responsive to a first subportion of the upper signal level, and to a second subportion of the lower signal level for producing said reference signal as the logical combination of said first and second subportions of signal levels.

12. Apparatus as in claim 11 comprising:
first means coupled to receive the upper signal level for producing the first subportion thereof within the range from about 40% to 60%; and
second means coupled to receive the lower signal level for producing the second subportion thereof substantially inversely to the first subportion and within the range from about 60% to 40%.

13. Apparatus as in claim 10 wherein said amplifier means is coupled to amplify such signals representative of contrasting marks to extend the maximum and minimum levels thereof substantially to selected upper and lower amplitude levels for all such signals representing contrasting marks detected on a background document.

14. Apparatus as in claim 13 wherein the rate at which the amplitudes of the signals change to extend to the upper and lower amplitude levels is slower than the rate at which said maximum and minimum levels are altered to interpose the reference level therebetween.

15. Apparatus as in claim 13 wherein said threshold means includes auxiliary circuit means for establishing said threshold level at a predetermined subportion of the average amplitude of the extended signals representative of detected contrasting marks.

16. Apparatus as in claim 15 wherein said auxiliary circuit means also alters said threshold level in response to the rate of change of the amplitude of the extended signals exceeding a value which is greater than the rate at which the amplitudes of such signals are changed to extend between upper and lower signal levels.

17. Apparatus as in claim 15 wherein said auxiliary circuit means also alters said threshold level in the direction of change of amplitude of the extended signals in response to the amplitude thereof crossing the established threshold level, said altering of the threshold level in the direction of change having a rate of change faster than the rate of change at which such signals are extended between upper and lower signal levels.

18. Method of processing video signals representative of contrasting marks detected on a background document comprising the steps of:

detecting the extreme limits of amplitude of a plural number of the video signal, producing in response to the upper and lower signal levels first intermediate and second dynamic reference signals, adjusting the extreme limits of amplitude of the signals to amplitudes that are greater than and less than a first selected reference level, interposing the level of said second dynamic reference signal between said maximum and minimum amplitude levels but less than said first intermediate reference signal, dynamically detecting with a second dynamic reference level the signals of amplitude greater in one direction than said first selected reference level but less than said video signals as representing detected contrasting marks, and the signals of amplitude greater in the opposite direction than said first selected reference level but less than said video signals as representing detected background of the document, producing an output indicative of a detected contrasting mark in response to an altered signal level exceeding a threshold level of said second dynamic signal in one direction, and producing an output indicative of detected background of the document in response to an altered signal level exceeding the theshold level of said second dynamic signal in the opposite direction.

* * * * *

UNITED STATES PATENT AND TRADEMARK OFFICE
CERTIFICATE OF CORRECTION

PATENT NO. : 4,691,239

DATED : September 1, 1987

INVENTOR(S) : Martin N. Nelson, J. Kirkwood H. Rough

It is certified that error appears in the above-identified patent and that said Letters Patent is hereby corrected as shown below:

Title page:

Assignee and Owner of the above identified patent should be indicated as Dest Corporation of Milpitas, California Signed and Sealed this Ninth Day of February, 1988

Attest:

DONALD J. QUIGG

Attesting Officer

Commissioner of Patents and Trademarks